United States Patent
Boulia

(10) Patent No.: US 7,461,150 B1
(45) Date of Patent: Dec. 2, 2008

(54) TECHNIQUE FOR SENDING TCP MESSAGES THROUGH HTTP SYSTEMS

(75) Inventor: Donald J. Boulia, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1793 days.

(21) Appl. No.: 09/619,178

(22) Filed: Jul. 19, 2000

(51) Int. Cl.
*G06F 15/16* (2006.01)

(52) U.S. Cl. ............... 709/227; 709/203; 709/228; 709/230; 709/239

(58) Field of Classification Search ........... 709/203, 709/227, 228, 239, 246, 230
See application file for complete search history.

(56) References Cited

U.S. PATENT DOCUMENTS

| | | | | |
|---|---|---|---|---|
| 5,638,516 A | * | 6/1997 | Duzett et al. | 709/239 |
| 5,793,966 A | * | 8/1998 | Amstein et al. | 709/203 |
| 5,935,212 A | * | 8/1999 | Kalajan et al. | 709/228 |
| 5,941,988 A | * | 8/1999 | Bhagwat et al. | 713/201 |
| 6,345,296 B1 | * | 2/2002 | McCrory et al. | 709/228 |
| 6,345,307 B1 | * | 2/2002 | Booth | 709/247 |
| 6,412,009 B1 | * | 6/2002 | Erickson et al. | 709/228 |
| 6,442,590 B1 | * | 8/2002 | Inala et al. | 709/204 |
| 2001/0013065 A1 | * | 8/2001 | Patki et al. | 709/227 |

OTHER PUBLICATIONS

Fielding, R. et al., "Hyper Text Transfer Protocol specification 1.1," RFC 2068 (Jan. 1997).*

* cited by examiner

*Primary Examiner*—Oanh Duong
(74) *Attorney, Agent, or Firm*—Marcia L. Doubet; Joseph E. Bracken

(57) ABSTRACT

The present invention provides a method, system, and computer program product for facilitating end-user access to remote applications based on TCP (Transmission Control Protocol). TCP traffic is packaged into the body of HTTP (HyperText Transfer Protocol) messages, enabling the TCP traffic to be transmitted through HTTP systems in an application-independent manner as if it were native HTTP traffic. TCP traffic therefore flows through firewall systems without requiring access to an external TCP port, and flows through HTTP proxy servers as well. The disclosed technique enables mapping bi-directional TCP messages to HTTP, which is designed for client-initiated message traffic only.

31 Claims, 5 Drawing Sheets

TECHNIQUE FOR SENDING TCP MESSAGES THROUGH HTTP SYSTEMS

BACKGROUND OF THE INVENTION

1. Field of the Invention

The present invention relates to distributed computing, and deals more particularly with a method, system, and computer program product for sending TCP (Transmission Control Protocol) messages through a network using the HyperText Transfer Protocol (HTTP) and HTTP-based systems.

2. Description of the Related Art

Business and consumer use of distributed computing, also commonly referred to as network computing, has gained tremendous popularity in recent years. In this computing model, the data and/or programs to be used to perform a particular computing task typically reside on (i.e. are "distributed" among) more than one computer, where these multiple computers are connected by a network of some type. The Internet, and the part of the Internet known as the World Wide Web (hereinafter, "Web"), are well-known examples of this type of environment wherein the multiple computers are connected using a public network. Other types of network environments in which distributed computing may be used include intranets, which are typically private networks accessible to a restricted set of users (such as employees of a corporation), and extranets (e.g., a corporate network which is accessible to other users than just the employees of the company which owns and/or manages the network, such as the company's business partners).

While businesses are eager to enable their business partners and customers to interact with their computing resources for business-to-business and business-to-consumer electronic commerce, those resources must be protected from unintended and malicious intrusion, and use of computing resources must be made as efficient as possible. Many business enterprises have therefore installed firewall systems and/or proxy systems in their enterprise networks. Firewall systems are used to limit access to computing resources. A firewall system typically limits incoming network traffic in an enterprise, as well as outgoing network traffic. Proxy systems act as an intermediary between end users or clients connected to a network and a remote server which is reachable through the network. Proxy systems are often associated with firewall systems, and these functions may be combined in some server implementations. Firewall and proxy functionality is typically implemented using a network traffic filtering approach. That is, incoming traffic may be filtered to determine whether it originates from a source which is permitted to access the enterprise's computing resources, and outgoing traffic may be filtered to determine whether it is destined for a remote location which meets certain predefined criteria. Firewall and proxy systems may also perform other services directed toward maximizing the efficiency of an enterprise's resources, such as caching and message logging.

The HyperText Transport Protocol (HTTP) is the communications protocol typically used for transmitting messages and data in the Web environment (and may be used in other networking environments as well). When a proxy is implemented for use with Web traffic or HTTP-based networks, it may be referred to as an "HTTP proxy".

Firewall and proxy systems, and the benefits they provide, are well known in the art. However, these systems may introduce undesirable limitations for an enterprise as well. Many firewall systems place a limitation on the number of ports which may be opened, and severely restrict the number of ports which may be opened for non-HTTP traffic such as TCP (Transmission Control Protocol) traffic. TCP was developed long before HTTP, and many applications exist which are designed for use with TCP. End users within an enterprise have a continuing need to access these applications, which may be remotely located and therefore require access through an external network. Similarly, an enterprise may have many TCP-based applications to which it would like to provide access for external users. Because of the security benefits which result from limiting the number of open TCP connections on a firewall, simply providing more TCP ports is not a viable way to address this problem. Furthermore, when HTTP proxies are in place, these proxies often restrict the traffic which flows through them to HTTP-based traffic, thereby adding further complications to those introduced by the firewall restrictions for transmitting TCP messages.

TCP is designed using a bi-directional computing model, wherein either party to a connection may initiate a message to the other. HTTP, on the other hand, is designed for communication using a transactional client/server model wherein requests are initiated by a client and responded to by a server: the protocol does not provide for server-initiated messages. The prior art therefore does not provide a technique for supporting TCP traffic as messages flowing through HTTP networks, nor for enabling TCP traffic to flow through an HTTP proxy of the type which has been discussed. At the same time, it is necessary to continue to provide end users with access to existing TCP-based applications. Rewriting or retrofitting the existing TCP-based application software to use a client/server model, and to use HTTP messages natively, would be extremely costly, time-consuming, and error-prone. This approach is therefore not a viable solution for most businesses.

Accordingly, what is needed is a technique for enabling TCP messages to be exchanged using HTTP networks and systems. This technique must not require change to existing client and server TCP-based software.

SUMMARY OF THE INVENTION

An object of the present invention is to provide a technique that facilitates end-user access to remote TCP-based applications.

Another object of the present invention is to provide a technique which enables TCP traffic to flow through firewalls without increasing the number of open TCP ports.

It is another object of the present invention to provide a technique which enables transmitting TCP traffic through HTTP proxy servers.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, a system, and a method for sending TCP messages through HTTP systems. This technique comprises: establishing a send channel from a first component on a client side of a network, through one or more HTTP-based systems, to a second component on a remote side of the network; establishing a receive channel from the first component, through the one or more HTTP-based systems, to the second component, wherein the receive channel is distinct from the send channel; establishing a first TCP connection from a client on the client side to the first component; establishing a second TCP connection from the second component to a target server on the remote side; transmitting client-initiated TCP requests from the client to the target server by packaging the client-initiated TCP requests into HTTP messages which are transmitted on the send channel; and transmitting server-initiated TCP requests from the target server to the client by packaging the client-initiated TCP requests into HTTP messages which are transmitted on the receive channel.

Transmitting the client-initiated TCP requests preferably further comprises: receiving a client-initiated TCP request from the client at the first component on the first TCP connection; packaging the received client-initiated TCP request in an HTTP POST request message; sending the HTTP POST request message to the second component on the send channel; receiving the sent HTTP POST request message at the second component; extracting the client-initiated TCP request from the received HTTP POST request message; and forwarding the extracted client-initiated TCP request to the target server on the second TCP connection. Transmitting the client-initiated TCP requests may further comprise acknowledging the HTTP POST request by sending an HTTP POST response from the second component to the first component on the send channel. The send channel is preferably established in response to receiving the client-initiated TCP request, and transmitting client-initiated TCP requests preferably further comprises receiving the HTTP POST response at the first component and then closing the send channel.

Transmitting the server-initiated TCP requests preferably further comprises: sending an HTTP GET request message from the first component to the second component on the receive channel; receiving the sent HTTP GET request message at the second component; receiving a server-initiated TCP request from the target server at the second component on the second TCP connection; packaging the received server-initiated TCP request in an HTTP GET response message which acknowledges the received HTTP GET request message; sending the HTTP GET response message from the second component to the first component on the receive channel; receiving the sent HTTP GET response message at the first component; extracting the server-initiated TCP request from the received HTTP GET response message; and forwarding the extracted server-initiated TCP request to the client on the first TCP connection. Transmitting the server-initiated TCP requests may further comprise performing a read operation on the second TCP connection, responsive to receiving the sent HTTP GET request message and prior to receiving the server-initiated TCP request, and using the received server-initiated TCP request as a result of the read operation, thereby triggering the packaging of the received server-initiated TCP request in the HTTP GET response message. Transmitting the server-initiated TCP requests preferably also further comprises preparing to receive another server-initiated TCP request by triggering the sending of the HTTP GET request message from the first component to the second component, responsive to receiving the sent HTTP GET response message at the first component.

A Multi-Purpose Internet Mail Extensions (MIME) type of the HTTP POST request message, the HTTP POST response message, the HTTP GET request message, and/or the HTTP GET response message may be set to "binary/tcp".

Rather than TCP and HTTP, the protocols involved may be an arbitrary bi-directional protocol and uni-directional protocol, respectively.

The present invention will now be described with reference to the following drawings, in which like reference numbers denote the same element throughout.

DESCRIPTION OF THE PREFERRED EMBODIMENT

Figure 1:
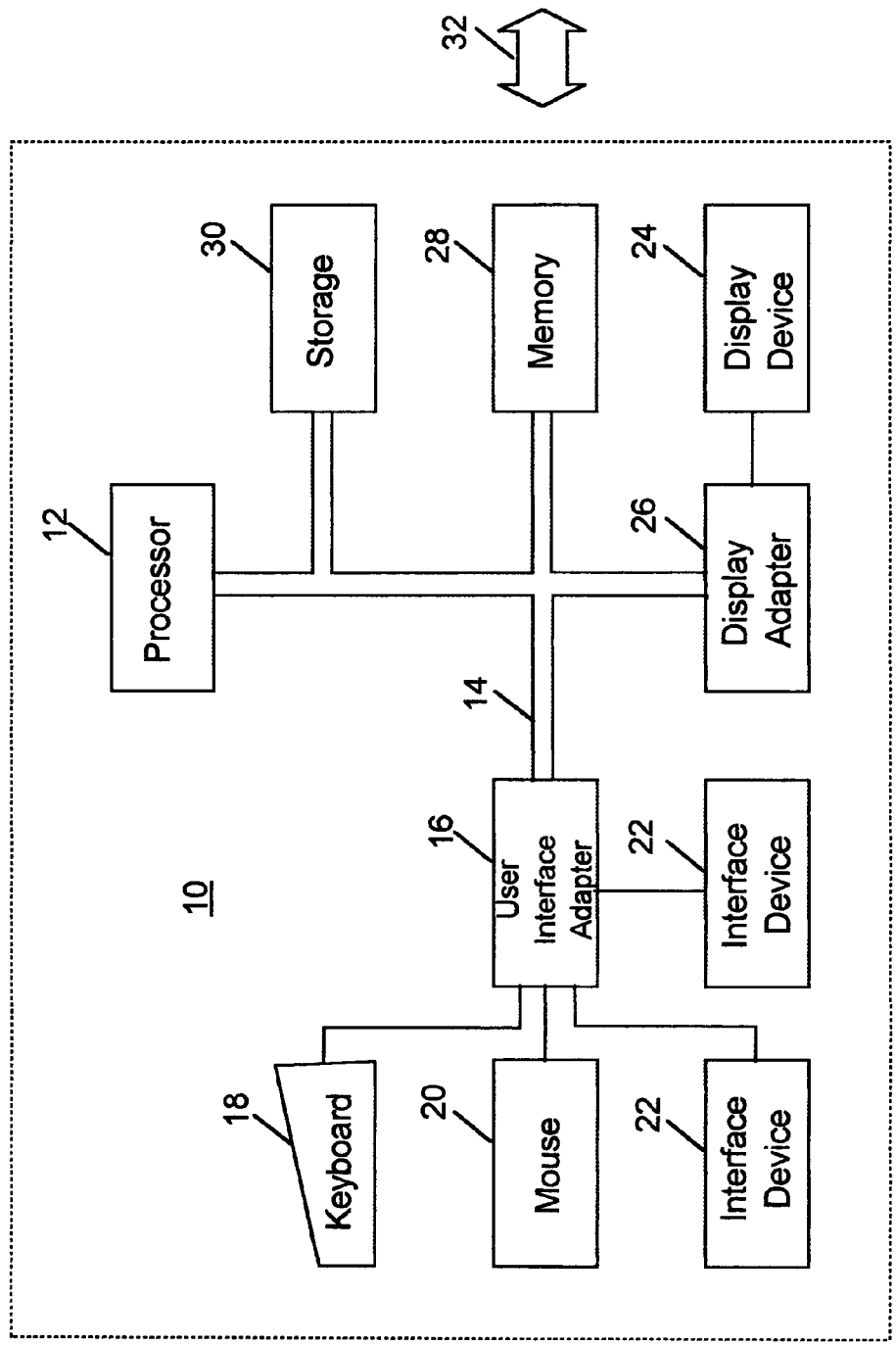
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

The hardware environment of a server is well known in the art. The preferred embodiment of the present invention operates partly on the client side of a network connection and partly on the server side of a network connection. On the client side, the present invention is preferably embodied in a device such as workstation 10. On the server side of the network connection, the present invention is preferably embodied in a server such as a Web application server or a load-balancing server which may be installed as an intermediary between the network and an application server.

Figure 2:
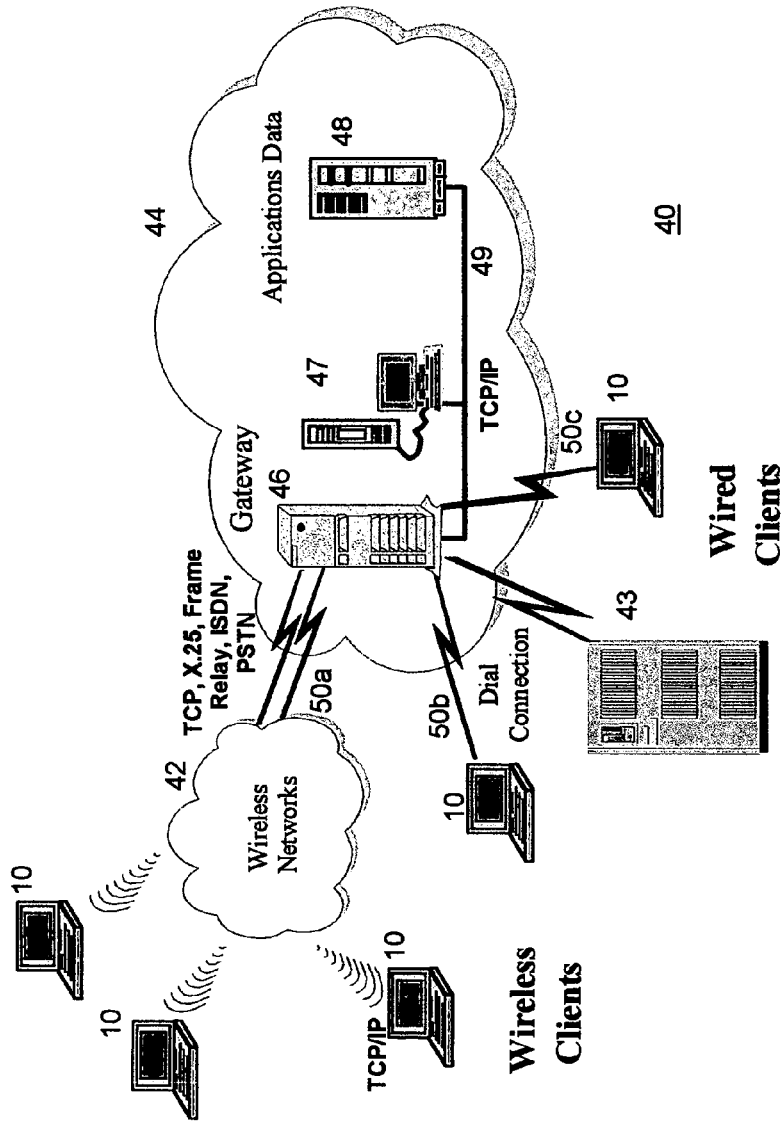
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the applications, midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 46 may also be coupled 49 to a storage device (such as data repository 48). Further, the gateway 46 may be directly or indirectly coupled to one or more workstations 10, and servers such as gateway 46 and application server 47 may be coupled to other servers such as server 43.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2. (Note that when the Host On-Demand product is used to access legacy host data, the IBM Systems Network Architecture and its protocols are also used within the network. It will be obvious to one of skill in the art how the configuration shown in FIG. 2 is augmented for this situation.)

Software programming code which embodies the present invention is typically accessed by the microprocessor 12 (for example, of the workstation 10, server 43, gateway 46, and/or server 47) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The requesting and responding devices which make use of the present invention, when connected, may use a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The requesting computer may be any type of computer processor, including laptop, handheld or mobile computers; vehicle-mounted devices; desktop computers; mainframe computers; etc., having processing and communication capabilities. The responding computer, similarly, can be one of any number of different types of computer which have processing and communication capabilities. These techniques are well known in the art, and the hardware devices and software which enable their use are readily available. (The requesting computer is referred to alternatively herein as the "requester" or "client" for ease of reference, although the requester may be a server machine operating as a client for a particular request/response scenario, such as a server which initiates a TCP request to another device. The responding computer is referred to alternatively herein as the "requester" or the "server", for ease of reference.)

In the preferred embodiment, the present invention is implemented in computer software. The implementation of the software of the present invention may operate as one or more modules (also referred to as code subroutines, or "objects" in object-oriented programming) on a client, server, or intermediary device in a network. In the preferred embodiment, the Java™ programming language is used. ("Java" is a trademark of Sun Microsystems, Inc.) References herein to use of the Java programming language, however, are for purposes of illustration and not of limitation.

The present invention provides an application-independent technique for facilitating end-user access to remote TCP-based applications. TCP traffic is packaged into the body of HTTP messages, enabling the TCP traffic to be transmitted through HTTP systems as if it were native HTTP traffic. This technique enables the TCP traffic to flow through firewall systems without requiring access to external TCP ports on the firewall, and enables the TCP traffic to flow through HTTP proxy servers as well. No change is required to existing end-user software, or to the remote application software executing on a target host system or application server.

As an added benefit, packaging the TCP traffic into HTTP messages using the technique disclosed herein enables the TCP traffic to automatically take advantage of encryption which may be provided (using, for example, the HTTPS protocol, which is a security-enhanced version of HTTP) for the traffic flowing through particular firewalls or proxy servers.

The preferred embodiment of the present invention will now be discussed in more detail with reference to FIGS. 3 and 4.

Figure 3:
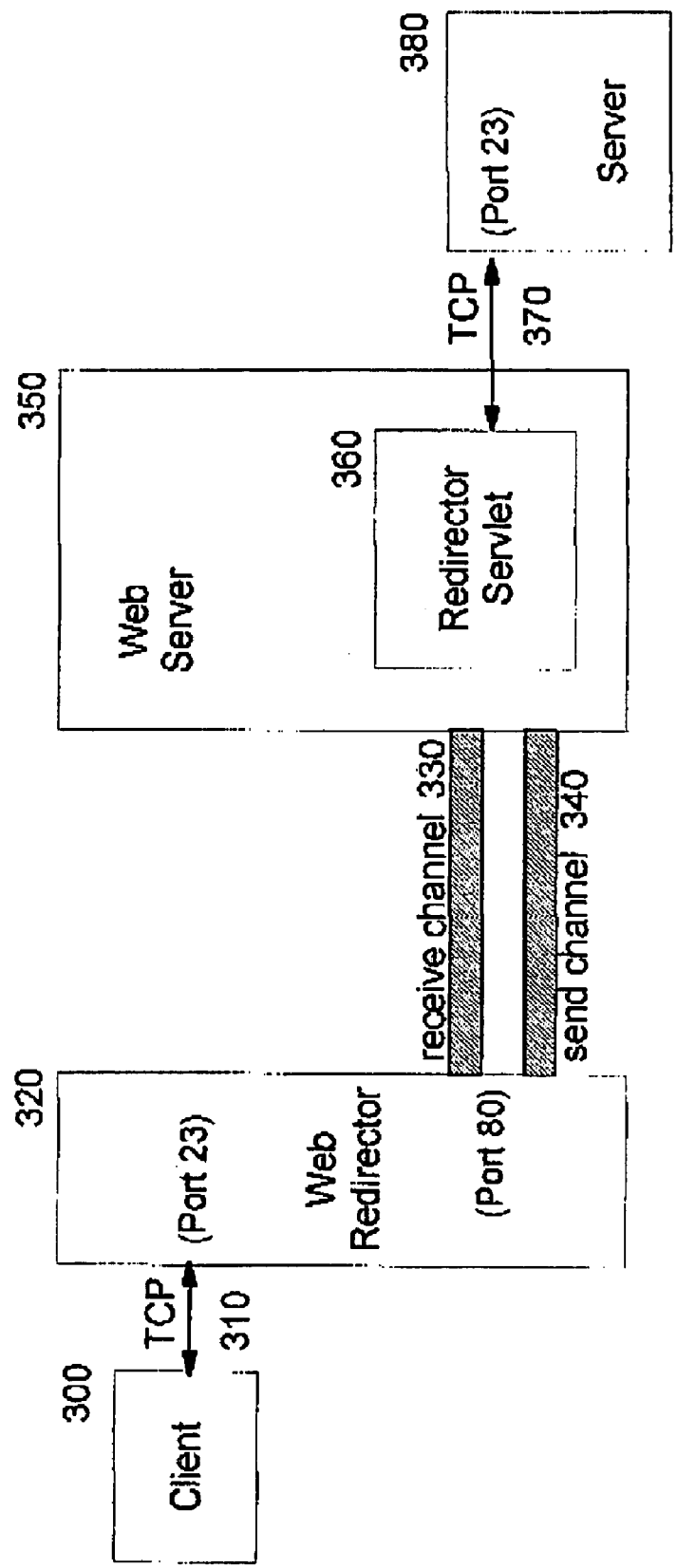
FIG. 3 provides a schematic illustration of the components which are used to implement a preferred embodiment of the present invention.

The components which may be used to implement the present invention are depicted in FIG. 3. The component which operates on the client side of a network connection is referred to herein as a "Web redirector", and is shown as element 320. The component which operates on the server side is referred to herein as a "redirector servlet", and is shown as element 360. (While the preferred embodiment describes the server-side component as a servlet, this is for purposes of illustration and not of limitation. An alternative implementation strategy may be substituted for the servlet model without deviating from the scope of the present invention.) The Web redirector 320 may execute on the same client device as the client's remote access software, where that software is depicted in FIG. 3 as client 300. Alternatively, Web redirector 320 may execute on a separate device to which the client software makes a local connection. (In this latter case, Web redirector 320 may serve more than a single client 300.) The redirector servlet 360 is preferably located on a Web application server 350 or other device which connects to a target host or target application server (referred to hereinafter as a target server for ease of reference). The target server is shown in FIG. 3 as server 380.

The preferred embodiment is described herein with reference to an example in which the client and server use the Telnet protocol. The Telnet protocol is designed to provide remote terminal connection wherein a user of one computing device logs on to an application at a remote computing device as if the user is a using a computing device which is locally-attached to the remote device. Telnet is widely used for accessing legacy host applications and legacy host data, and provides for insulating the application from the details of the particular type of user computing device. While the preferred embodiment is discussed herein with reference to Telnet clients and Telnet servers, however, it is equally applicable to clients and servers which use other TCP-based protocols (such as File Transfer Protocol, or "FTP", Gopher, etc.). Furthermore, the present invention may be used advantageously for transporting messages for bi-directional protocols other than TCP, including proprietary protocols, and may use underlying protocols other than HTTP for this transmission provided the alternative underlying protocol has features which are semantically equivalent to those described herein for HTTP.

Client and server software which is written to communicate using TCP messages uses the concept of a connection between two sockets for exchanging data, where a socket is comprised of an address identifying one of the computers involved and a port number that identifies a particular process on that computer. The process identified by the port number is the process that will receive the incoming data for that socket. A socket is typically implemented as a queue, and the receiving process therefore retrieves data from its incoming socket queue. Port numbers may be temporarily assigned for use with a particular application, or may be permanently assigned such that they are, by convention, used with all implementations. Port numbers of the latter type are referred to as "well-known port numbers". The well-known port number for Telnet messages is port 23; the well-known port number for HTTP messages is port 80. These well-known port numbers are used herein for purposes of illustration and not of limitation.

According to the present invention, client software 300 continues to use port 23 for sending and receiving data on a TCP connection (shown in FIG. 3 as element 310), in the same manner it normally connects to a TCP connection, where the Web redirector 320 is now configured as the other party of that TCP connection. The software at server 380 also continues to use port 23 for sending and receiving TCP data, as in its normal operations, where the redirector servlet 360 is now at the other end of the TCP connection 370 to server 380. The client software and the software at a server therefore operates without change when using the present invention.

Web redirector 320 and redirector servlet 360 provide the bi-directional communication which is needed for exchanging TCP messages by establishing two channels, shown in FIG. 3 as a "receive" channel 330 and a "send" channel 340. The traffic which flows on channels 330 and 340 uses HTTP messages, and thus the Web redirector 320 and redirector servlet 360 are configured to use port number 80 for this HTTP traffic.

Use of the receive channel 330 and send channel 340 to support bi-directional TCP traffic will now be illustrated with reference to an example and with reference to the diagrams in FIGS. 4A and 4B. Suppose an end user is using a terminal emulator to communicate with a remote legacy host application, where the legacy host application is located behind a firewall. The terminal emulator might also reside in a system which is protected by a firewall on the client side. The present invention enables communicating through these firewalls, and through any intermediate HTTP proxies which may be installed between the client device on which the terminal emulator is executing and the target host on which the legacy host application is executing, without requiring change to the client software (i.e. the terminal emulator) or to the remote legacy application software.

Figure 4A:
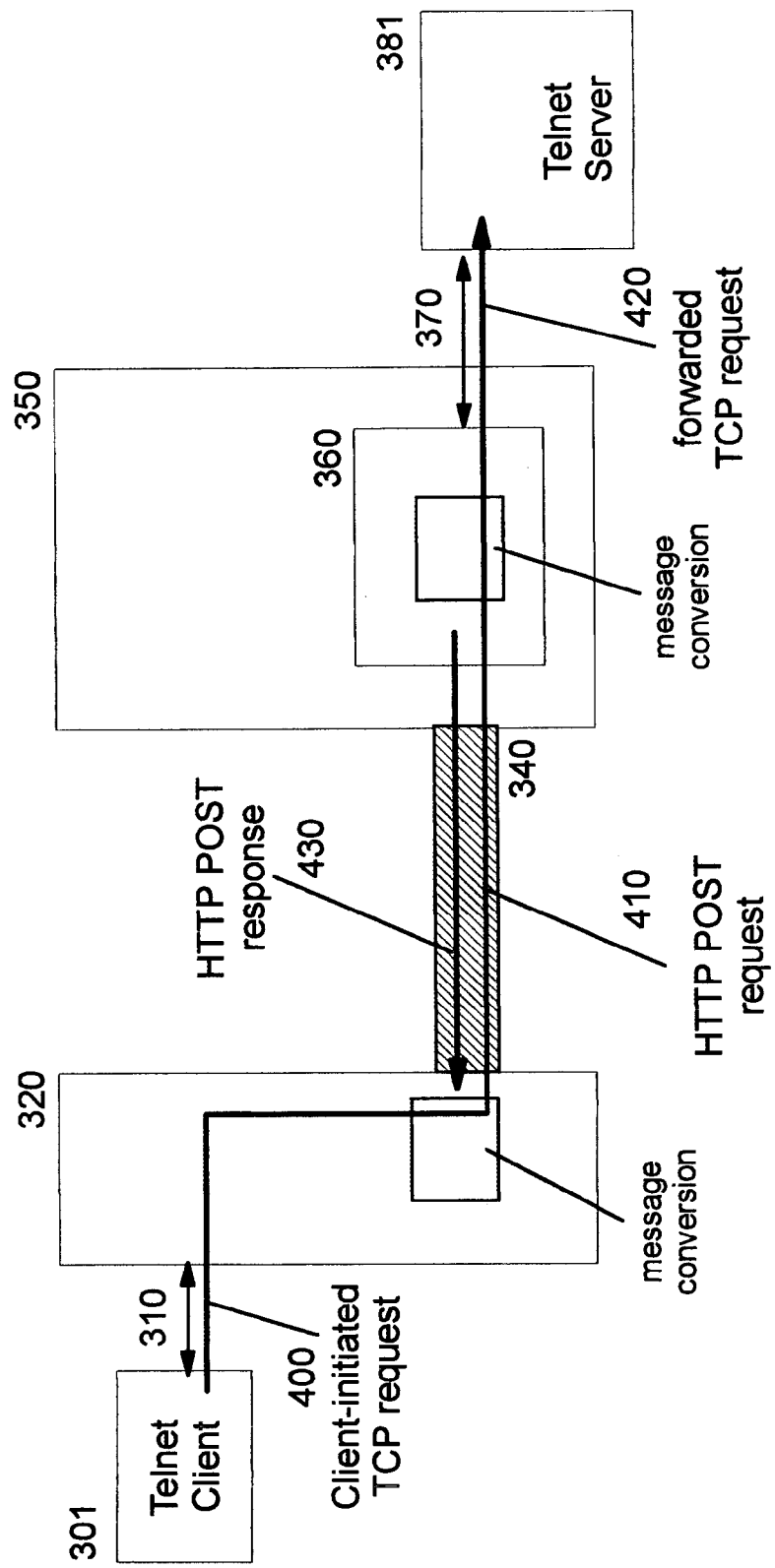
FIGS. 4A and 4B provide diagrams showing how the bi-directional message flow for TCP-based applications is supported when messages are initiated by the client and by the server, respectively, according to a preferred embodiment of the present invention.

The terminal emulator, depicted in the example of FIG. 4A as Telnet client 301, is configured to connect to Web redirector 320 using TCP connection 310. The Telnet client sends TCP messages over this connection as if it is communicating directly to the remote target host, shown in FIG. 4A as Telnet server 381. An example of a client-initiated TCP request message is shown at 400. The Web redirector 320 listens to port 23 for incoming TCP data from client 301. When a TCP message such as message 400 is received from the client, Web redirector 320 inserts that message, in its entirety, into the body of an HTTP POST request message 410. The MIME (Multi-Purpose Internet Mail Extensions) type of this request message is preferably set to "binary/tcp" to prevent it from being misinterpreted by proxies or clients in the network path to redirector servlet 360. References herein to the use of a specific MIME type, however, are for purposes of illustration and not of limitation. The HTTP POST request message 410 is then transmitted from Web redirector 320 to redirector servlet 360 on the send channel 340. Preferably, the send channel is re-established (by creating a new HTTP POST request) each time a message needs to be sent from a particular client 301 to a particular target server 381.

The redirector servlet 360 receives the inbound HTTP POST message 410 sent from Web redirector 320 on channel 340, and is configured to route these incoming HTTP request messages to the target server (such as server 381). When an incoming HTTP POST request message 410 is received, the redirector servlet 360 extracts the TCP message 400 from the body of this message and forwards the extracted message as a TCP request message 420 over TCP connection 370 to Telnet server 381. To complete the round-trip of the HTTP POST request, an HTTP POST response 430 is then returned from the redirector servlet 360 to the Web redirector 320. The send channel 340 is then preferably closed, and will be re-established when client 301 sends its next TCP request to Web redirector 320.

Preferably, TCP connection 370 is established in response to receiving the first HTTP request message from a particular client which requests port 23 to this target server 381, and this connection is then maintained for the life of the servlet 360. In the preferred embodiment, the first HTTP request message will be an HTTP GET request, sent by Web redirector 320 (as described below with reference to FIG. 4B) to establish a receive channel with the redirector servlet 360. Subsequent incoming HTTP POST and GET messages from the same client to this same target server are preferably associated with this established TCP connection 370 using the session tracking classes and methods which are provided with the Java Web Server Toolkit from Sun Microsystems.

Session tracking classes and methods enable state information to be maintained and made available to servlets. The state information is stored on a server using a session object.

This object is created when a new client session begins, and is kept for the duration of the session. The object stores information about the transactions occurring between the client and the server. (In the present invention, the client for purposes of session tracking is the Web redirector 320 and the server is the redirector servlet 360.) An interface to the object is defined so that servlets can access and modify the state information to reflect the transactions they process for that client. A Session Identifier ("Session ID") is associated with each client, and is used to correlate a particular session object to the proper client. Preferably, a different session ID is used for each end user client 300 for which Web redirector 320 operates as an HTTP session client. A session ID may be any type of identifier that serves to uniquely identify a particular client to the server. This session ID is then sent as part of the HTTP request syntax for each message sent from the client machine. The server (i.e., redirector servlet 360, in this case) uses the session ID to store information related to the transactions with this client, so that the series of transactions can be treated as a logical on-going communication between the client and the server (instead of simply as random, unrelated messages). The session then encompasses all requests from this client that use this same identifier.

Session IDs have been implemented on top of the inherently state-less HTTP protocol using two primary approaches. The first is through use of "cookies". The second is through "URL rewriting". Cookies and URL rewriting are known in the art, and will not be described in detail herein. The Java Toolkit session tracking classes and methods support both cookies and URL rewriting for passing the session ID between the client and server (and subsequently to servlets).

Figure 4B:
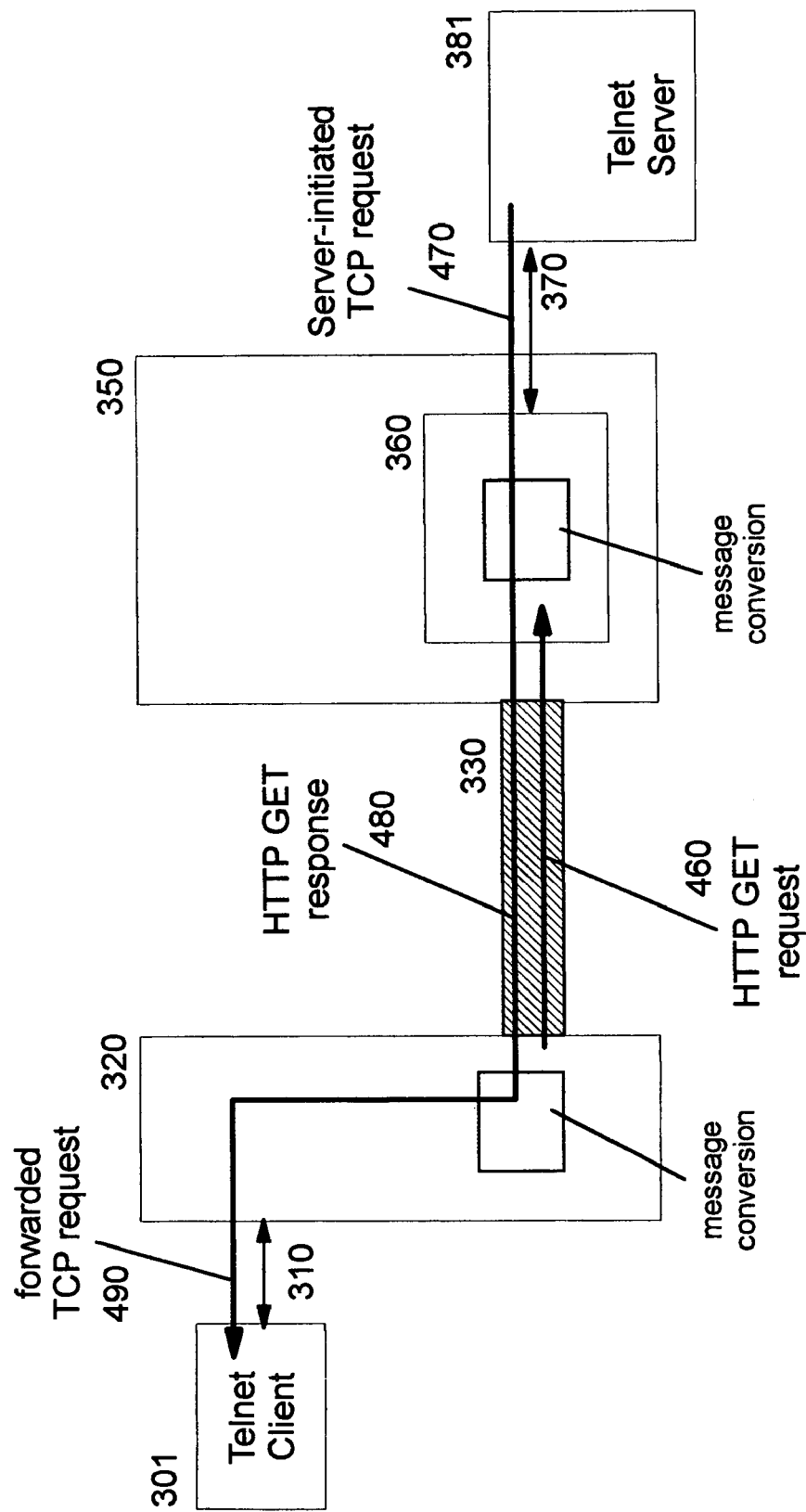

FIG. 4B illustrates how the present invention supports server-initiated TCP request messages. Suppose Telnet server 381 wishes to send a TCP request to Telnet client 301. Because HTTP is a client-oriented protocol, all messages must originate from the client. The present invention solves this problem by sending an HTTP GET request message (depicted in FIG. 4B as HTTP GET request message 460) from the Web redirector 320 on the receive channel 330, where this HTTP GET request serves to open the communications channel through the redirector servlet 360 to the target server 381. As with the other HTTP messages used in the preferred embodiment, the MIME type of HTTP GET request message 460 is preferably set to "binary/tcp". Web Redirector 320 is always listening on this receive channel 330 for an incoming message from redirector servlet 360. After redirector servlet 360 receives incoming HTTP GET request 460, it performs a TCP read request on the TCP socket for connections 370. This call blocks until the server 381 puts its response onto the TCP socket queue, as in the prior art. When target server 381 has a message to send to client 301, it generates a TCP request 470 and sends that request on TCP connection 370 to redirect servlet 360. Upon receiving TCP request message 470, the redirector servlet's TCP read request on the socket for connection 370 unblocks. Redirector servlet 360 inserts the TCP request 470 into the body of an HTTP GET response message 480 and forwards that HTTP GET response 480 to the Web redirector 320 on receive channel 320. (The MIME type of this HTTP GET response message 480 is also preferably set to "binary/tcp"). Upon receiving this response 480, thereby completing the sound-trip of HTTP GET request 460, the Web redirector 320 (1) sends another HTTP GET request message to redirector servlet 360 (in order to accept the next incoming message generated by target server 381) and (2) extracts the server's TCP request 470 from the body of the HTTP GET response 480. This extracted TCP request is then forwarded to the client 301 on the local TCP connection 310, as shown at 490. This process of listening for incoming messages on the receive channel, extracting the content, and forwarding it to the client then repeats until the connection between client 301 and server 381 is closed.

As has been demonstrated, the present invention provides a novel technique for enabling TCP-based messages to be exchanged using HTTP networks and systems, without requiring change to existing client TCP-based software or to existing TCP-based host systems or application software. If firewell systems installed in the network between the Web redirector 320 and redirector servlet 360 are configured to encrypt the messages they exchange, then the TCP messages sent between a particular client and target server are automatically encrypted as well.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for sending Transmission Control Protocol (TCP) messages through HyperText Transfer Protocol (HTTP) systems, the computer program product embodied on one or more computer-readable media and comprising:

computer-readable program code means for establishing a send channel from a first component on a client side of a network, through one or more HTTP-based systems, to a second component on a remote side of the network;

computer-readable program code means for establishing a receive channel from the first component, through the one or more HTTP-based systems, to the second component, wherein the receive channel is distinct from the send channel;

computer-readable program code means for establishing a first TCP connection from a client on the client side to the first component;

computer-readable program code means for establishing a second TCP connection from the second component to a target server on the remote side;

computer-readable program code means for transmitting client-initiated TCP requests from the client to the target server by packaging the client-initiated TCP requests into HTTP messages which are transmitted on the send channel; and computer-readable program code means for transmitting server-initiated TCP requests from the target server to the client by packaging the server-initiated TCP requests into HTTP messages which are transmitted on the receive channel.

2. The computer program product according to claim 1, wherein the computer-readable program code means for transmitting client-initiated TCP requests further comprises:

computer-readable program code means for receiving a client-initiated TCP request from the client at the first component on the first TCP connection;

computer-readable program code means for packaging the received client-initiated TCP request in an HTTP POST request message;

computer-readable program code means for sending the HTTP POST request message to the second component on the send channel;

computer-readable program code means for receiving the sent HTTP POST request message at the second component;

computer-readable program code means for extracting the client-initiated TCP request from the received HTTP POST request message; and computer-readable program code means for forwarding the extracted client-initiated TCP request to the target server on the second TCP connection.

3. The computer program product according to claim 2, wherein the computer-readable program code means for transmitting client-initiated TCP requests further comprises computer-readable program code means for acknowledging the HTTP POST request by sending an HTTP POST response from the second component to the first component on the send channel.

4. The computer program product according to claim 3, wherein the computer-readable program code means for establishing the send channel operates in response to the computer-readable program code means for receiving the client-initiated TCP request, and wherein the computer-readable program code means for transmitting client-initiated TCP requests further comprises:

computer-readable program code means for receiving the HTTP POST response at the first component; and computer-readable program code means for closing the send channel, responsive to operation of the computer-readable program code means for receiving the HTTP POST response.

5. The computer program product according to claim 1, wherein the computer-readable program code means for transmitting server-initiated TCP requests further comprises:

computer-readable program code means for sending an HTTP GET request message from the first component to the second component on the receive channel;

computer-readable program code means for receiving the sent HTTP GET request message at the second component;

computer-readable program code means for receiving a server-initiated TCP request from the target server at the second component on the second TCP connection;

computer-readable program code means for packaging the received server-initiated TCP request in an HTTP GET response message which acknowledges the received HTTP GET request message;

computer-readable program code means for sending the HTTP GET response message from the second component to the first component on the receive channel;

computer-readable program code means for receiving the sent HTTP GET response message at the first component;

computer-readable program code means for extracting the server-initiated TCP request from the received HTTP GET response message; and computer-readable program code means for forwarding the extracted server-initiated TCP request to the client on the first TCP connection.

6. The computer program product according to claim 5, wherein the computer-readable program code means for transmitting server-initiated TCP requests further comprises:

computer-readable program code means for performing a read operation on the second TCP connection, responsive to operation of the computer-readable program code means for receiving the sent HTTP GET request message and prior to operation of the computer-readable program code means for receiving the server-initiated TCP request; and computer-readable program code means for using the received server-initiated TCP request as a result of the read operation, thereby triggering operation of the computer-readable program code means for packaging the received server-initiated TCP request in the HTTP GET response message.

7. The computer program product according to claim 5, wherein the computer-readable program code means for transmitting server-initiated TCP requests further comprises computer-readable program code means for preparing to receive another server-initiated TCP request by triggering operation of the computer-readable program code means for sending the HTTP GET request message from the first component to the second component, responsive to operation of the computer-readable program code means for receiving the sent HTTP GET response message at the first component.

8. The computer program product according to claim 2, wherein a Multi-Purpose Internet Mail Extensions (MIME) type of the HPPT POST request message is set to "binary/tcp".

9. The computer program product according to claim 5, wherein a Multi-Purpose Internet Mail Extensions (MIME) type of the HTTP GET request message is set to "binary/tcp".

10. A system for sending Transmission Control Protocol (TCP) messages through HyperText Transfer Protocol (HTTP) systems, comprising:

means for establishing a send channel from a first component on a client side of a network, through one or more HTTP-based systems, to a second component on a remote side of the network;

means for establishing a receive channel from the first component, through the one or more HTTP-based systems, to the second component, wherein the receive channel is distinct from the send channel;

means for establishing a first TCP connection from a client on the client side to the first component;

means for establishing a second TCP connection from the second component to a target server on the remote side;

means for transmitting client-initiated TCP requests from the client to the target server by packaging the client-initiated requests into HTTP messages which are transmitted on the send channel; and means for transmitting server-initiated TCP requests from the target server to the client by packaging the server-initiated requests into HTTP messages which are transmitted on the receive channel.

11. The system according to claim 10, wherein the means for transmitting client-initiated TCP requests further comprises:

means for receiving a client-initiated TCP request from the client at the first component on the first TCP connection;

means for packaging the received client-initiated TCP request in an HTTP POST request message;

means for sending the HTTP POST request message to the second component on the send channel;

means for receiving the sent HTTP POST request message at the second component;

means for extracting the client-initiated TCP request from the received HTTP POST request message; and means for forwarding the extracted client-initiated TCP request to the target server on the second TCP connection.

12. The system according to claim 11, wherein the means for transmitting client-initiated TCP requests further comprises means for acknowledging the HTTP POST request by sending an HTTP POST response from the second component to the first component on the send channel.

13. The system according to claim 12, wherein the means for establishing the send channel operates in response to the means for receiving the client-initiated TCP request, and wherein the means for transmitting client-initiated TCP requests further comprises:

means for receiving the HTTP POST response at the first component; and means for closing the send channel, responsive to operation of the means for receiving the HTTP POST response.

14. The system according to claim 10, wherein the means for transmitting server-initiated TCP requests further comprises:

means for sending an HTTP GET request message from the first component to the second component on the receive channel;

means for receiving the sent HTTP GET request message at the second component;

means for receiving a server-initiated TCP request from the target server at the second component on the second TCP connection;

means for packaging the received server-initiated TCP request in an HTTP GET response message which acknowledges the received HTTP GET request message;

means for sending the HTTP GET response message from the second component to the first component on the receive channel;

means for receiving the sent HTTP GET response message at the first component;

means for extracting the server-initiated TCP request from the received HTTP GET response message; and means for forwarding the extracted server-initiated TCP request to the client on the first TCP connection.

15. The system according to claim 14, wherein the means for transmitting server-initiated TCP requests further comprises:

means for performing a read operation on the second TCP connection, responsive to operation of the means for receiving the sent HTTP GET request message and prior to operation of the means for receiving the server-initiated TCP request; and means for using the received server-initiated TCP request as a result of the read operation, thereby triggering operation of the means for packaging the received server-initiated TCP request in the HTTP GET response message.

16. The system according to claim 14, wherein the means for transmitting server-initiated TCP requests further comprises means for preparing to receive another server-initiated TCP request by triggering operations of the means for sending the HTTP GET request message from the first component to the second component, responsive to operation of the means for receiving the sent HTTP GET response message at the first component.

17. The system according to claim 11, wherein a Multi-Purpose Internet Mail Extensions (MIME) type of the HTTP POST request message is set to "binary/tcp".

18. The system according to claim 14, wherein a Multi-Purpose Internet Mail Extensions (MIME) type of the HTTP GET request message is set to "binary/tcp".

19. A method for sending Transmission Control Protocol (TCP) messages through HyperText Transfer Protocol (HTTP) systems, comprising the steps of:

establishing a send channel from a first component on a client side of a network, through one or more HTTP-based systems, to a second component on a remote side of the network;

establishing a receive channel from the first component, through the one or more HTTP-based systems, to the second component, wherein the receive channel is distinct from the send channel;

establishing a first TCP connection from a client on the client side to the first component;

establishing a second TCP connection from the second component to a target server on the remote side;

transmitting client-initiated TCP requests from the client to the target server by packaging the client-initiated requests into HTTP messages which are transmitted on the send channel; and transmitting server-initiated TCP requests from the target server to the client by packaging the server-initiated requests into HTTP messages which are transmitted on the receive channel.

20. The method according to claim 19, wherein the step of transmitting client-initiated TCP requests further comprises the steps of:

receiving a client-initiated TCP request from the client at the first component on the first TCP connection;

packaging the received client-initiated TCP request in an HTTP POST request message;

sending the HTTP POST request message to the second component on the send channel;

receiving the sent HTTP POST request message at the second component;

extracting the client-initiated TCP request from the received HTTP POST request message; and forwarding the extracted client-initiated TCP request to the target server on the second TCP connection.

21. The method according to claim 20, wherein the step of transmitting client-initiated TCP requests further comprises the step of acknowledging the HTTP POST request by sending an HTTP POST response from the second component to the first component on the send channel.

22. The method according to claim 21, wherein the step of establishing the send channel operates in response to the step of receiving the client-initiated TCP request, and wherein the step of transmitting client-initiated TCP requests further comprises the steps of:

receiving the HTTP POST response at the first component; and closing the send channel, responsive to receiving the HTTP POST response.

23. The method according to claim 19, wherein the step of transmitting server-initiated TCP requests further comprises the steps of:

sending an HTTP GET request message from the first component to the second component on the receive channel;

receiving the sent HTTP GET request message at the second component;

receiving a server-initiated TCP request from the target server at the second component on the second TCP connection;

packaging the received server-initiated TCP request in an HTTP GET response message which acknowledges the received HTTP GET request message;

sending the HTTP GET response message from the second component to the first component on the receive channel;

receiving the sent HTTP GET response message at the first component;
extracting the server-initiated TCP request from the received HTTP GET response message; and
forwarding the extracted server-initiated TCP request to the client on the first TCP connection.

24. The method according to claim 23, wherein the step of transmitting server-initiated TCP requests further comprises the steps of:
performing a read operation on the second TCP connection, responsive to receiving the sent HTTP GET request message and prior to receiving the server-initiated TCP request; and
using the received server-initiated TCP request as a result of the read operation, thereby triggering the step of packaging the received server-initiated TCP request in the HTTP GET response message.

25. The method according to claim 23, wherein the step of transmitting server-initiated TCP requests further comprises the step of preparing to receive another server-initiated TCP request by triggering the step of sending the HTTP GET request message from the first component to the second component, responsive to receiving the sent HTTP GET response message at the first component.

26. The method according to claim 20, wherein a Multi-Purpose Internet Mail Extensions (MIME) type of the HTTP POST request message is set to "binary/tcp".

27. The method according to claim 23, wherein a Multi-Purpose Internet Mail Extensions (MIME) type of the HTTP GET request message is set to "binary/tcp".

28. A method for transporting bi-directional protocol traffic through uni-directional protocol systems, comprising the steps of:
establishing a send channel from a first component on a client side of a network connection, through one or more uni-directional protocol-based systems, to a second component on a remote side of the network connection;
establishing a receive channel from the first component, through the one or more uni-directional protocol-based systems, to the second component, wherein the receive channel is distinct from the send channel;
establishing a first bi-directional protocol connection from a client on the client side to the first component;
establishing a second bi-directional protocol connection from the second component to a target server on the remote side;
transmitting client-initiated bi-directional protocol requests from the client to the target server by packaging the client-initiated bi-directional protocol requests into uni-directional protocol messages which are transmitted on the send channel; and
transmitting server-initiated bi-directional protocol requests from the target server to the client by packaging the server-initiated bi-directional protocol requests into uni-directional protocol messages which are transmitted on the receive channel.

29. The method according to claim 28, wherein the step of transmitting client-initiated bi-directional protocol requests further comprises the steps of:
receiving a client-initiated bi-directional protocol request from the client at the first component on the first bi-directional protocol connection;
packaging the received client-initiated bi-directional protocol request in a uni-directional protocol write request message;
sending the uni-directional protocol write request message to the second component on the send channel;
receiving the sent uni-directional protocol write request message at the second component;
extracting the client-initiated bi-directional protocol request from the received uni-directional protocol write request message; and
forwarding the extracted client-initiated bi-directional protocol request to the target server on the second bi-directional protocol connection.

30. The method according to claim 28, wherein the step of transmitting server-initiated bi-directional protocol requests further comprises the steps of:
sending a uni-directional protocol read request message from the first component to the second component on the receive channel;
receiving the sent uni-directional protocol read request message at the second component;
receiving a server-initiated bi-directional protocol request from the target server at the second component on the second bi-directional protocol connection;
packaging the received server-initiated bi-directional protocol request in a uni-directional protocol read response message which acknowledges the received uni-directional protocol read request message;
sending the uni-directional protocol read response message from the second component to the first component on the receive channel;
receiving the sent uni-directional protocol read response message at the first component;
extracting the server-initiated bi-directional protocol request from the received uni-directional protocol read response message; and
forwarding the extracted server-initiated bi-directional protocol request to the client on the first bi-directional protocol connection.

31. A system for providing bi-directional messaging over uni-directional protocol systems, comprising:
a send channel established from a first component on a client side of a network connection, through at least one uni-directional protocol-based system, to a second component on a remote side of the network connection;
a receive channel established from the first component, through the at least one uni-directional protocol-based system, to the second component, wherein the receive channel is distinct from the send channel;
a first bi-directional protocol connection established between a client on the client side and the first component; and
a second bi-directional protocol connection established between the second component and a server on the remote side;
wherein the first component packages client-initiated bi-directional protocol requests, which are sent from the client on the first bi-directional protocol connection and received at the first component, into uni-directional protocol messages and forwards the packaged client-initiated protocol requests to the second component using the send channel and upon receipt of the forwarded client-initiated requests, the second component extracts the client-initiated bi-directional protocol requests and forwards the extracted client-initiated bi-directional protocol requests to the server on the second bi-directional protocol connection, thereby providing client-to-server messaging through the at least one uni-directional protocol-based system; and
wherein the second component packages server-initiated bi-directional protocol requests, which are sent from the server on the second bi-directional protocol connection and received at the second component, into uni-directional protocol messages and forwards the packaged server-initiated protocol requests to the first component using the receive channel and upon receipt of the forwarded server-initiated requests, the first component extracts the server-initiated bi-directional protocol requests and forwards the extracted server-initiated bi-directional protocol requests to the client on the first bi-direction protocol connection, thereby providing server-to-client messaging through the at least one uni-directional protocol-based system.

* * * * *